Sept. 7, 1965 G. W. FYLER ETAL 3,205,453

BALANCED PHASE DETECTOR IN AUTOMATIC FREQUENCY CONTROL CIRCUIT

Original Filed May 1, 1961 2 Sheets-Sheet 1

INVENTORS
George W. Fyler
Richard L. Sager
By James E. Tracy
Atty.

INVENTORS
George W. Fyler
Richard L. Sager
By James E. Tracy
Atty.

United States Patent Office 3,205,453

Patented Sept. 7, 1965

3,205,453

BALANCED PHASE DETECTOR IN AUTOMATIC FREQUENCY CONTROL CIRCUIT

George W. Fyler, Lombard, and Richard L. Sager, Roselle, Ill., assignors to Zenith Radio Corporation, Chicago, Ill., a corporation of Delaware Original application May 1, 1961, Ser. No. 106,859. Divided and this application Dec. 5, 1962, Ser. No. 242,497

4 Claims. (Cl. 331—20)

Figure 1:
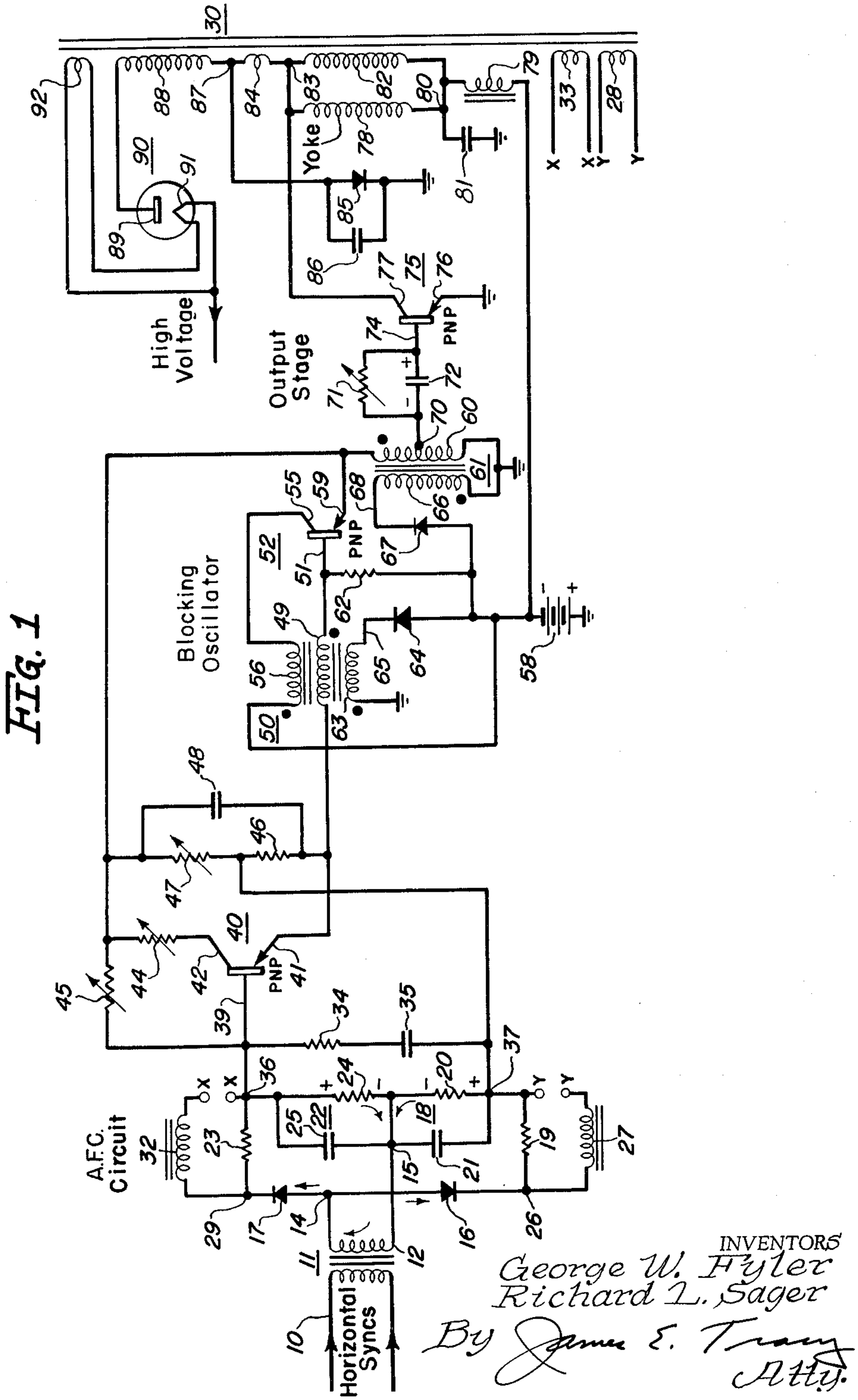

This application is a division of copending application Serial No. 106,859, filed May 1, 1961. This invention pertains in general to a new and improved automatic frequency control circuit for controlling the operating frequency of a television scanning generator. More specifically, the invention relates to a novel balanced phase detector for controlling the frequency of a transistorized horizontal scanning generator.

It is customary to employ in sweep systems for achieving horizontal scanning of television receivers an automatic frequency control (AFC) circuit to insure that precise phase synchronism is maintained between the received horizontal synchronizing components and the line scanning signal for the picture tube. Quite often the automatic frequency control circuit takes the form of a balanced phase detector which provides a control voltage which varies in amplitude and polarity in accordance with the phase relationship of the instantaneous scanning signals and the received synchronizing pulses. A balanced type detector is employed to render the system substantially immune to undesired noise signals which may be interspersed with the desired synchronizing components. Unfortunately, most, if not all, of the balanced phase detectors developed to date are actually not precisely balanced due to the nature of their construction, and thus do not achieve the optimum in noise immunity. Furthermore, their effectiveness is largely lost where they are required to operate into finite load impedances.

In accordance with the present invention, a phase detector is provided which is accurately balanced. It includes a source of signal pulses periodically recurring at a predetermined frequency. There is a first series circuit including, in the order named, the pulse signal source, a first unidirectional device, a source of a first sawtooth shaped signal also periodically recurring at the predetermined frequency but having a phase relative to the signal pulses which is subject to variation, and one section of a two-section load circuit. A second series circuit is provided which includes, in the order named, the pulse signal source, a second unidirectional device, a source of a second sawtooth shaped signal also periodically recurring at the predetermined frequency and having a constant phase relationship with respect to the first sawtooth shaped signal, and the second section of the load circuit. The first and second unidirectional devices are coupled in series opposition across the two-section load circuit. The balanced phase detector of the present invention also includes means for developing across the two-section load circuit a control signal which varies in accordance with changes in the relative phase of the signal pulses and the sawtooth shaped signals.

Figure 2:
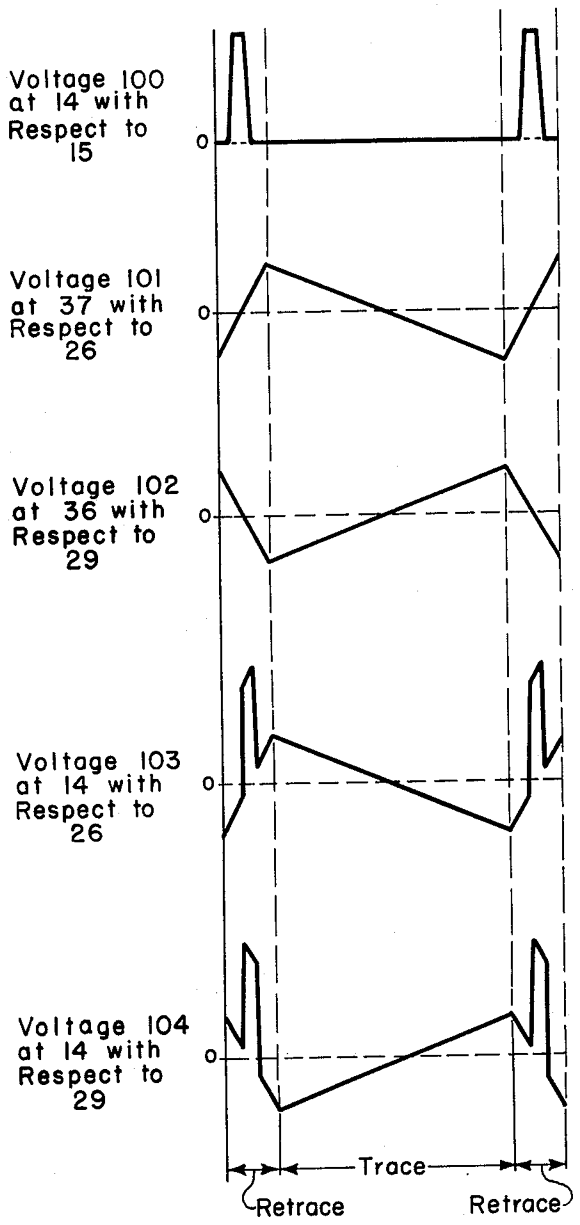

The features of this invention which are believed to be new are set forth with particularity in the appended claims. The invention, together with further objects and advantages thereof, may best be understood, however, by reference to the following description in conjunction with the accompanying drawings in which:

FIGURE 1 is a schematic diagram of a transistorized horizontal sweep system for a television receiver which includes an automatic frequency control circuit constructed in accordance with the invention; and, FIGURE 2 comprises signal waveforms helpful in explaining the operation of the AFC circuit of FIGURE 1.

Turning now to a structural description of the scanning system of FIGURE 1, the primary winding 10 of a transformer 11 is coupled to a source of horizontal or line synchronizing pulses. One side of secondary winding 12 of transformer 11 is coupled to a circuit junction or terminal 14 and the other side of winding 12 is connected to a circuit junction 15. Junction or terminal 14 is connected to the plate or anode of a unidirectional device or diode 16 and also to the plate or anode of another unidirectional device or diode 17, the cathode of diode 16 being connected in series with a resistor 19 and the parallel combination 18 of a resistor 20 and a condenser 21 to circuit junction or terminal 15. The cathode terminal of diode 17 is similarly coupled in series with a resistor 23 and resistor 24, shunted by a capacitor 25, to circuit junction 15. For convenience, the parallel combination of resistor 24 and condenser 25 is designated network 22.

Connected in parallel with resistor 19 is the series combination of an inductance coil 27 and a secondary winding 28 of a horizontal output transformer 30. In the interest of simplifying the drawing, terminals Y—Y of resistor 19 and coil 27 have been shown to indicate a connection with corresponding terminals Y—Y of winding 28. Likewise, resistor 23 is shunted by the series combination of an inductance coil 32 and a secondary winding 33 of horizontal output transformer 30, winding 33 being interconnected with resistor 23 and coil 32 by means of terminals X—X. For convenience, the junction of resistor 19, coil 27, and the cathode of diode 16 is designated by the numeral 26. Likewise, the junction or terminal of resistor 23, coil 32, and the cathode of diode 17 is labeled 29.

The series combination of a resistor 34 and a capacitor 35 is coupled between the junction 36 of resistor 23, network 22, and the junction 37 of resistor 19 and network 18.

All of the circuitry in the drawing discussed thus far collectively constitute an automatic frequency control (AFC) circuit of the balanced phase detector type, and constructed in accordance with the invention, for providing a control signal between terminals 36 and 37 (and thus across networks 18 and 22 which together constitute a two-section load circuit) varying in accordance with changes in the relative phase of the horizontal synchronizing pulses applied to primary winding 10 and the scanning signals developed in horizontal output transformer 30. Condensers 21 and 25 filter out the horizontal frequency components.

Circuit junction 36 is also connected to the base electrode 39 of a PNP type transistor 40. Collector 42 of PNP transistor 40 is connected through a pair of adjustable resistors 44 and 45 to base 39, the junction of resistors 44 and 45 being coupled through the series arrangement of an adjustable resistor 47 and a fixed resistor 46 to emitter 41. Resistors 46 and 47 are shunted by a condenser 48, and the junction of those resistors is connected to junction or terminal 37. Transistor 40 presents a resistance between emitter 41 and collector 42, the value of which is determined by the instantaneous amplitude of the control signal developed across two-section load circuit 18, 22.

Emitter 41 is connected through a secondary winding 49 of a transformer 50 to the base electrode 51 of another PNP type transistor 52. Collector electrode 55 of transistor 52 is connected through the primary winding 56 of transformer 50 to the negative terminal of a source of unidirectional operating potential, shown as a battery 58, the positive terminal of which is connected to ground. Emitter 59 of transistor 52 is connected to the junction of resistors 44, 45 and 47 and also through a load, in the form of an inductance coil 60, to ground. More specifically, inductance coil 60 constitutes the primary winding of a transformer 61. Since the operation of inductance coil 60 is affected by the circuitry coupled thereto, the term "inductive load 60" actually refers to coil 60 plus the resistive circuitry coupled thereto. Load 60 comprises the load on transistor 52. Base 51 is connected to the negative terminal of potential source 58 via a resistor 62. Transformer 50 has another secondary winding 63, one terminal of which is connected to ground and the other (designated 65) of which is connected to the cathode terminal of a unidirectional device or diode 64, the anode terminal of diode 64 being connected to the negative terminal of potential source 58. Inductively coupled to inductance coil 60 is a coil 66, one side of which is connected to ground and the other (designated 68) to the cathode terminal of a unidirectional device or diode 67, the anode or plate terminal of the diode being connected to the negative terminal of source 58.

The circuit elements associated with transistor 52 collectively function as a blocking oscillator, the free running operating frequency of which is determined in part by the instantaneous resistance presented between emitter 41 and collector 42 of transistor 40. As will be described in detail later, transistor 52 conducts during each trace interval and is turned off during each retrace interval.

A tap 70 of inductive load or primary winding 60 is connected through an adjustable resistor 71, shunted by a capacitor 72, to the base electrode 74 of another PNP type transistor 75. Emitter electrode 76 of transistor 75 is grounded, while collector 77 of the transistor is coupled to the negative terminal of potential source 58 by way of a horizontal magnetic deflection yoke 78 and an inductance coil 79 connected in series. Although deflection yoke 78 may have some resistance, with respect to the horizontal scanning frequency it acts substantially as an inductive reactance. The junction 80 of yoke 78 and inductance coil 79 is by-passed to ground via a condenser 81. The primary winding 82 of horizontal output transformer 30 is connected in shunt with yoke 78. An additional winding 84, preferably constituting only a single winding turn, of transformer 30 is connected in series-aiding relationship with primary winding 82, one terminal of additional winding 84 consequently being connected to high potential terminal 83 of winding 82, while the other termial 87 is connected to the plate or anode terminal of a unidirectional device or damper diode 85, the cathode terminal of which is connected to ground. A condenser 86 shunts damper 85.

Transistor 75 and the circuitry associated therewith collectively constitute an output stage which, in response to an input drive signal from the blocking oscillator, effects the translation of a periodically recurring sawtooth waveform in magnetic deflection yoke 78.

Also connected to primary winding 82 and additional winding 84 is secondary winding 88, one terminal of which is consequently connected to high potential terminal 87 of additional winding 84 and the other terminal of which is connected to the plate or anode 89 of a high voltage rectifier tube 90. The cathode filament 91 of rectifier 90 is connected to another winding 92 of horizontal output transformer 30 in order to receive heater power. An output connection is provided on one side of filament-cathode 91 to provide high voltage for the second anode of a conventional picture tube. It, of course, will be noted that with respect to windings 82, 84 and 88 output transformer 30 functions as an autotransformer.

In describing the operation of the invention, attention is also directed to the signal wave forms of FIGURE 2 which appear between various points or terminals in the circuit diagram of FIGURE 1. Conventional horizontal- or line-synchronizing pulses periodically recurring at the horizontal- or line-scanning frequency are derived from the customary synchronizing signal separator (not shown) and are applied to primary winding 10 of transformer 11. They appear as positive polarity pulses at terminal 14 with respect to terminal 15 as shown by voltage wave form 100 in FIGURE 4. Of course, each pulse of wave form 100 occurs during a retrace interval. Meanwhile, flyback pulses, each of which also occurs during a retrace interval of a line-scanning cycle, are developed in windings 28 and 33 of horizontal output transformer 30 and are fed back to the automatic frequency control circuit. Resistor 19 and inductance coil 27 constitute an integrating circuit with respect to the flyback pulses developed across winding 28, and likewise resistor 23 and inductance coil 32 constitute an integrating circuit for the flyback pulses developed in winding 33. As a consequence, sawtooth shaped voltage waveforms 101 and 102 are developed across resistor 19 and resistor 23, respectively. Waveform 101 is found at terminal 37 relative to terminal 26, and waveform 102 appears at terminal 36 with respect to terminal 29. The phase relationship between these sawtooth voltages is, of course, opposite and constant. Sawtooth shaped signals 101 and 102 which have amplitudes less than that of the sync pulses across secondary 12, indicate the instantaneous operating frequency of the scanning generator, namely the combination of the blocking oscillator and output stage of FIGURE 1.

It will be noted that the balanced phase detector includes two separate series circuits, one of which includes, in the order named, the synchronizing pulse signal source, namely secondary winding 12, diode 16, the integrating circuit of resistor 19 and coil 27 which constitute a source of sawtooth shaped signal 101, and section 18 of two-section load circuit 18, 22. The other series circuit includes, in the order named, pulse signal source 12, diode 17, the integrating circuit including resistor 23 and coil 32 which is a source of a sawtooth shaped signal 102, and a section 22 of two-section load circuit 18, 22. Diodes 16 and 17 are thus connected in series opposition across the two-section load circuit whereas they are connected in parallel across source 12. Consequently the synchronizing pulses render diodes 16 and 17 conductive at the same time and effect equal current flow (ignoring the sawtooth voltage of waveforms 101 and 102) through loads 18 and 22 in the direction of the arrows. As a result, the sync pulses produce average voltages across resistors 20 and 24 with the polarity shown by the + and − signs, which voltages tend to cancel out across two-section load circuit 18, 22, namely between circuit junctions or terminals 36 and 37. Likewise, sawtooth signals 101 and 102 (ignoring the sync components) also tend to produce average current flows through loads 18 and 22 which cancel out across the two-section load circuit, diode 16 conducting to effect current flow through load 18 in the direction shown by the adjacent arrow during the positive portions of voltage waveform 101 and diode 17 conducting to cause current flow through load 22 in the direction shown by the adjacent arrow during the positive portions of voltage waveform 102. Assuming that the sawtooth voltages are of the same amplitude, average voltages are developed across resistors 20 and 24 with the polarity shown and cancel out to zero across the entire two-section load section 18, 22.

Considering now the effect of the synchronizing pulses of voltage waveform 100 on the operation of the balanced phase detector and assuming that the operating frequency of the blocking oscillator and the output stage is precisely in synchronism with the frequency of the horizontal synchronizing pulses, voltage waveform 103 appears between terminal 14 and the cathode of diode 16 (junction 26), and voltage waveform 104 appears between circuit junction 14 and the cathode of diode 17 (junction 29). It will be noted that the synchronizing components of waveforms 103 and 104 appear substantially at the midpoint of the retrace intervals. Under such circumstances, the average amplitudes of the voltages developed across load circuits 18 and 22 are equal and thus both the sawtooth shaped signals and the synchronizing pulse signals are effectively cancelled out between terminals 36 and 37. As a result, there will be a zero voltage difference between terminals 36 and 37 which is indicative of operation of the scanning generator precisely at the line-scanning frequency. Transistor 40 is normally operated in the middle of its conduction range (namely, Class A), resistor 45 providing a forward bias. Base 39 is consequently normally slightly negative relative to emitter 41. Resistors 47 and 46 are selected such that their junction is at the same negative potential as base 39. With this arrangement, when there is a zero voltage difference across terminals 36 and 37, transistor 40 still operates causing an emitter-collector current flow of a magnitude representing operation of the line-scanning generator exactly at the horizontal sync frequency.

If the frequency of the sawtooth shaped signals 101 and 102 tends to deviate from the frequency of the line-synchronizing components, the phase relationship between the sync pulses and the sawtooth shaped signals will vary. Assuming, for example, that the scanning generator tends to operate at a faster or higher frequency than the frequency of the horizontal syncs, the phase relationship between the sync pulses and the sawtooth component waveform 103 will vary, the sync pulses occurring some time during the second half of each of the retrace intervals. As a consequence, the peak voltage of waveform 103 increases while the peak voltage of waveform 104 decreases, causing an unbalance of the voltages developed across two-section load circuit 18, 22. Specifically, the average voltage developed across section 18 will be greater than that developed across load 22, which has a net effect of increasing the voltage difference between emitter 41 and base 39, the base going negative with respect to the emitter. This increases the emitter-collector current of transistor 40, causing a decrease in the frequency of the blocking oscillator.

The automatic frequency control circuit of FIGURE 1 is thus accurately balanced and achieves improved immunization against noise disturbances.

The frequency of operation of the blocking oscillator, and consequentially the frequency of operation of the scanning generator, is determined in part by the AFC control signal developed across two-section load circuit 18, 22. Resistors 44, 45, 46 and 47 also affect the blocking oscillator frequency. Adjusting resistor 45 varies the operating point of transistor 40, resistor 44 determines the range of operation, and the adjustment of resistor 47 varies the frequency of the blocking oscillator. Since the emitter-collector path of transistor 40 is in series with the base-emitter circuit of blocking oscillator transistor 52, the amplitude and polarity of the AFC control voltage applied to the base-emitter junction of transistor 40 will determine, in part, the magnitude of the base input drive current for transistor 52. This follows because the resistance between emitter 41 and collector 42 varies with variations in the AFC control voltage.

Transistor 52 is normally forward biased by virtue of the connection of base 51 to the negative terminal of operating potential source 58 via resistor 62, emitter 59 being at ground potential. When the system is initially placed into operation, transistor 52 is turned on, like a switch, as a result of the forward bias provided by potential source or battery 58 and a trace interval is started. At that time, the amount of base drive current flowing through the base-emitter path of transistor 52 is more than enough to maintain the transistor in a saturated condition. This effects current translation through the series circuit including inductive load or primary winding 60, the emitter-collector path of transistor 52 and primary winding 56 of transistor 50 to the negative terminal of potential source 58.

However, due to the fact that the collector load, including primary 56 and primary 60, is largely inductive, the emitter-collector current of transistor 52 is not permitted to increase instantaneously but instead increases in sawtooth fashion. The increasing current in primary winding 56 induces a voltage in secondary winding 49, the negative polarity terminal of which is that connected to base 51 in order to maintain transistor 52 conductive.

Inasmuch as inductive load 60, which as mentioned before actually includes the circuitry coupled thereto, has a resistive component, the emitter-collector current of transistor 52 does not increase completely linearly. The time rate of change of current through primary winding 56 therefore decreases while the emitter-collector current is increasing. Consequently, the voltage induced in winding 49 decreases with a resultant decreasing base drive current. The emitter-collector current increases until the decreasing base drive current reaches the point at which transistor 52 no longer is saturated. At that instant, the rise in collector current ceases and the magnetic field of primary 56 collapses to induce a voltage in secondary winding 49 of a positive polarity at the terminal adjacent base 51 to reverse bias the base-emitter junction of transistor 52, cutting it off rapidly. The cutting off process is aided by the customary regenerative action typical in blocking oscillators.

Transistor 52 is maintained in its off condition during an interval, which of course is the retrace time, determined primarily by the construction of transformer 50. The positive voltage across winding 49 must terminate before transistor 52 becomes forward biased again to initiate another cycle of operation in the same manner as described.

As is well known, changing the base drive current, which occurs by varying the resistance between emitter 41 and collector 42 of transistor 40, changes the saturation point of transistor 52 and thus changes the frequency of operation of the blocking oscillator. For example, decreasing the base drive current lowers the saturation point and thus decreases the trace time. A more detailed explanation of the operation of the blocking oscillator may be found in the aforementioned copending application Serial No. 106,859.

The voltage at emitter 59 with respect to ground increases negatively during each trace interval because of the increasing emitter-collector current of transistor 52. The voltage across inductive load 60 is substantially proportional to the increasing collector current multiplied by the reflected or transferred load resistance of the base-emitter circuit of transistor 75. During each trace interval, inductive energy is stored in the magnetic field of inductive load 60. Relatively high amplitude positive going pulses occur during retrace at emitter 59 with respect to ground as a result of the energy built up and stored in inductive load 60 during each trace interval.

Output transistor 75 in a sense is operated in a similar fashion as transistor 52, in that it basically serves as a switch, being turned on or rendered conductive during each trace interval, and is turned off or rendered non-conductive during each retrace interval. Driving of transistor 75 in such a manner is achieved by the voltage developed at emitter 59. As described in detail in copending application Serial No. 106,859, the output stage effects the development in magnetic deflection yoke 78 of a scanning current having a periodically recurring sawtooth waveshape.

While a particular embodiment of the invention has been shown and described, modifications may be made, and it is intended in the appended claims to cover all such modifications as may fall within the true spirit and scope of the invention.

We claim:

1. A balanced phase detector comprising: a source of signal pulses periodically recurring at a predetermined frequency, said source having first and second output terminals;

a load circuit including two series-connected load sections having a common terminal;

a first series circuit including, in the order named, said pulse signal source, a first unidirectional device directly connected to said first output terminal of said pulse signal source, a source of a first sawtooth shaped signal also periodically recurring at said predetermined frequency, but having a phase relative to said signal pulses which is subject to variation, and one section of said load circuit with said common terminal thereof directly connected to said second output terminal of said pulse signal source;

a second series circuit including, in the order named, said pulse signal source, a second unidirectional device directly connected to said first output terminal, a source of a second sawtooth shaped signal also periodically recurring at said predetermined frequency and having a constant phase relationship with respect to said first sawtooth shaped signal, and the second section of said load circuit, said first and second unidirectional devices connected in series opposition across said two-section load circuit;

and means for developing aiross said two-section load circuit a control signal which varies in accordance with changes in the relative phase of said signal pulses and said sawtooth shaped signals.

2. A balanced phase detector comprising: a load circuit including two series-connected load sections;

first and second unidirectional devices connected in series opposition across said load circuit;

a source of signal pulses periodically recurring at a predetermined frequency;

means for connecting said unidirectional devices in parallel across said pulse signal source;

a source of first sawtooth shaped signal also periodically recurring at said predetermined frequency;

means for coupling said first saw tooth shaped signal source in series with said first unidirectional device, said pulse signal source and one section of said load circuit;

a source of a second sawtooth shaped signal also periodically recurring at said predetermined frequency and having a constant phase relationship with respect to said first sawtooth shaped signal;

means for coupling said second sawtooth shaped signal source in series with said second unidirectional device, said pulse signal source and the other section of said two-section load circuit, the amplitude and polarity of said first and second sawtooth shaped signals being such that said sawtooth shaped signals tend to cancel out across said two-section load circuit, whereas said signal pulses tend to cancel out only if a predetermined phase relationship exists between said signal pulses and said sawtooth shaped signals.

and means for developing across said two-section load circuit a control signal which varies in accordance with changes in the relative phase of said signal pulses and said sawtooth shaped signals.

3. An automatic frequency control circuit comprising:

a source of synchronizing pulses periodically recurring at a predetermined frequency, said source having first and second output terminals;

a load circuit including two series-connected load sections having a common terminal;

a first series circuit including, in the order named, said synchronizing pulse source, a first unidirectional device directly connected to said first output terminal of said synchronizing pulse source, a first integrating circuit, and one section of said load circuit with said common terminal thereof connected to said second output terminal of said synchronizing pulse source;

a second series circuit including, in the order named, said synchronizing pulse source, a second unidirectional device directly connected to said first output terminal, a second integrating circuit, and the second section of said load circuit, said first and second unidirectional devices connected in series opposition across said two-section load circuit;

a scanning generator;

means for simultaneously developing in said scanning generator a pair of feedback signals each of which contains a series of pulses recurring at the instantaneous frequency of said scanning generator;

means for applying said pair of feedback signals to said first and second integrating circuits respectively to produce first and second sawtooth shaped signals having average amplitudes and polarities tending to cancel out across said two-section load circuit, said synchronizing pulses tending to cancel out across said load circuit only if a predetermined phase relationship exists between said synchronizing pulses and said sawtooth shaped signals indicative of operation of said scanning generator at said predetermined frequency;

means for developing across said two-section load circuit a control signal which varies in amplitude any time the frequency of operation of said scanning generator deviates from said predetermined frequency; and means for utilizing said control signal to control the operating frequency of said scanning generator.

4. An automatic frequency control circuit comprising:

a source of horizontal synchronizing pulses periodically recurring at a predetermined frequency, said source having first and second output terminals;

a load circuit including two series-connected load sections having a common terminal;

a first series circuit including, in the order named, said synchronizing pulse source, a first unidirectional device directly connected to said first output terminal of said synchronizing pulse source, a first integrating circuit including a resistor and an inductance coil, and one section of said load circuit with said common terminal thereof directly connected to said second output terminal of said synchronizing pulse source;

a second series circuit including, in the order named, said synchronizing pulse source, a second unidirectional device, directly connected to said first output terminal, a second integrating circuit including a resistor and an inductance coil, and the second section of said load circuit, said first and second unidirectional devices connected in series opposition across said two-section load circuit;

a transistorized horizontal scanning generator;

means for simultaneously developing in said scanning generator a pair of feedback signals each of which contains a series of pulses recurring at the instantaneous frequency of said horizontal scanning generator;

means for applying said pair of feedback signals to said first and second integrating circuits respectively to produce first and second sawtooth shaped signals having average amplitudes and polarities tending to cancel out across said two-section load circuit, said horizontal synchronizing pulses tending to cancel out across said load circuit only if a predetermined phase relationship exists between said synchronizing pulses and said sawtooth shaped signals indicative of operation of said scanning generator at said predetermined frequency;

means for developing across said two-section load circuit a control signal which varies in amplitude anytime the frequency of operation of said horizontal scanning generator deviates from said predetermined frequency; and means for utilizing said control signal to control the operating frequency of said scanning generator.

References Cited by the Examiner

UNITED STATES PATENTS

| | | | |
|---|---|---|---|
| 2,742,591 | 4/56 | Procter | 331—20 X |
| 3,029,391 | 4/62 | Fyler | 331—26 X |
| 3,061,674 | 10/62 | Janssen et al. | 178—69.5 |
| 3,070,657 | 12/62 | Shimada | 331—20 X |

ROY LAKE, *Primary Examiner.*

JOHN KOMINSKI, *Examiner.*